United States Patent [19]

Uchiike

[11] Patent Number: 5,493,078
[45] Date of Patent: Feb. 20, 1996

[54] ELECTRONIC BALANCE AND ITS APPLICATION TO A THERMAL ANALYZER

[75] Inventor: Mitsumasa Uchiike, Kyoto, Japan

[73] Assignee: Shimadzu Corporation, Kyoto, Japan

[21] Appl. No.: 30,772

[22] Filed: Mar. 12, 1993

[30] Foreign Application Priority Data

Mar. 31, 1992 [JP] Japan ........................... 4-108537

[51] Int. Cl.⁶ ................ G01G 3/14; G01G 1/38
[52] U.S. Cl. ................ 177/212; 177/210 EM; 374/14
[58] Field of Search ............ 177/212, 210 EM; 374/14; 250/214 C

[56] References Cited

U.S. PATENT DOCUMENTS

| | | | |
|---|---|---|---|
| 4,625,819 | 12/1986 | O'Neill | 177/212 |
| 4,982,081 | 1/1991 | Schmidt | 250/214 C X |
| 5,193,910 | 3/1993 | Kinoshita | 374/14 X |
| 5,266,792 | 11/1993 | Crowne et al. | 250/214 C |

FOREIGN PATENT DOCUMENTS

| | | |
|---|---|---|
| 58-82130 | 5/1983 | Japan. |
| 58-162819 | 9/1983 | Japan. |
| 59-231421 | 12/1984 | Japan. |

OTHER PUBLICATIONS

IBM Technical Disclosure Bulletin, vol. 30, No. 7, Dec. 1987, New York, U.S., pp. 432–434, "Servo–Controlled High–Accuracy and Low–Cost Electronic Scale".

Primary Examiner—Peter S. Wong
Assistant Examiner—Randy W. Gibson
Attorney, Agent, or Firm—Oliff & Berridge

[57] ABSTRACT

An electronic balance provided with a correcting circuit for canceling a thermal drift in the output of a photoreceiver. The photoreceiver is composed of two photosensitive areas and the shadow of a shutter moving with the beam of the balance is cast on the two photosensitive areas. The outputs of the two photosensitive areas are sent to a first subtracting circuit and an adding circuit. The output of the first subtracting circuit is corrected by the output of the adding circuit to produce signal independent of temperature change and corresponding only to the turn of the beam of the electronic balance.

12 Claims, 5 Drawing Sheets

ELECTRONIC BALANCE AND ITS APPLICATION TO A THERMAL ANALYZER

The present invention relates to an electronic balance using a photodetector for detecting the equilibrium (or the imbalance) of the balance.

BACKGROUND OF THE INVENTION

An electronic balance is used to detect a very small change in the mass (or the weight) of an object, and is especially useful for a thermal analysis of a sample in which the change in the mass of the sample is continuously detected while it is heated (or cooled). Such an electronic balance is explained referring to FIG. 1. A sample tray 9 and a feedback coil 7 are supported by a beam 4 which is sustained by a fulcrum 8 placed between them, and a shutter 3 is fixed to an end of the beam 4. Apart from the beam 4, a photoemitter 2 and a photoreceiver 1 are placed opposing each other with the shutter 3 between them. The photoreceiver 1 is composed of two photosensitive areas 11 and 12 aligned along the direction of the movement of the shutter 3 (vertically in the case of FIG. 1). When the mass of a sample 15 on the sample tray 9 changes, the beam 4 turns and the shutter 3 moves vertically with its shadow 13 on the photoreceiver 1. This changes the shares of the light received by the two photosensitive areas 11 and 12, and thus the difference between the outputs of the two photosensitive areas 11 and 12 changes, too.

A magnet 6 is placed around the feedback coil 7 so that they react magnetically. The position of the feedback coil 7 can be changed by altering the electric current supplied to the feedback coil 7, and a controller 5 controls the current so that the difference of the outputs of the two photosensitive areas 11 and 12 does not change (i.e., so that the beam 4 is stable). Thus the mass of the sample 15 is measured by detecting the current flowing through the feedback coil 7.

The turn of the beam 4 is detected by an imbalance detecting circuit, as shown in FIG. 5, provided in the controller 5. In the circuit diagram of FIG. 5, the photodiodes D11 and D12 correspond to the photosensitive areas 11 and 12, respectively. The current I1 flowing through the photodiode D11 represents the amount of light received by the photosensitive area 11 and the current I2 flowing through the photodiode D12 represents the amount of light received by the photosensitive area 12. A subtracting circuit composed of an operational amplifier OP3 and three resistors R11, R12 and R2 produces a voltage Vdt3 corresponding to the difference between the two currents I1 and I2. The current to the feedback coil 7 is controlled by another circuit in the controller 5 so that the voltage Vdt3 is constant.

A problem about the prior art electronic balance is that, a drift occurs in the outputs of the photoreceiver 1 and also in the difference of the outputs due to change in the ambient temperature or other factors. In this case, the imbalance detecting circuit (FIG. 5) of the controller 5 generates an erroneous signal though the beam 4 does not turn, and the controller 5 alters the current to the feedback coil 7, which turns the beam 4, whereby a wrong mass is measured.

SUMMARY OF THE INVENTION

The present invention addresses the problem and provides an electronic balance which can always measure a correct mass canceling such drift in the output of the photoreceiver. The present invention also provides a thermal analyzer using such an electronic balance. According to one feature of the present invention, an electronic balance includes:

a beam sustained by a fulcrum and supporting a sample at an arm of the beam;

a balancer including a moving part supported by the other arm of the beam and a fixed part placed independent of the beam for electromagnetically exerting force to the beam;

a shutter fixed to the beam;

a photoemitter;

a photoreceiver placed opposing the photoemitter and including two photosensitive areas aligned along the movement of the shutter so that a shadow of the shutter is cast on a portion of each of the two photosensitive areas a controller for receiving outputs of the two photosensitive areas and for sending a control signal to the balancer so that the difference of the two outputs is constant, whereby the control signal represent the mass of the sample; and correcting means for receiving the outputs of the two photosensitive areas and for correcting the control signal according to the sum of the two outputs.

The sum of the outputs of the two photosensitive areas is unchanged even if the beam moves. But the sum includes the same drift as that included in the two outputs and hence in the difference of the two outputs. Thus, by properly combining the output of the correcting means (sum) with the difference, the influence of the drift can be canceled.

According to another feature of the present invention, an electronic balance includes:

a beam sustained by a fulcrum and supporting a sample at an arm of the beam;

a balancer including a moving part supported by the other arm of the beam and a fixed part placed independent of the beam for electromagnetically exerting force to the beam;

a shutter fixed to the beam;

a photoemitter;

a photoreceiver placed opposing the photoemitter and including three photosensitive areas in which two of the photosensitive areas are aligned along the movement of the shutter so that a shadow of the shutter is cast on a portion of each of the two photosensitive areas and the third photosensitive area is placed out of the shadow a controller for receiving outputs of the two photosensitive areas and for sending a control signal to the balancer so that the difference of the two outputs is constant, whereby the control signal represent the mass of the sample; and correcting means for receiving the output of the third photosensitive area and for correcting the control signal according to the output of the third photosensitive area.

In this feature, the output of the third photosensitive area is treated similarly to the sum of the two outputs in the above feature.

Other features and variations of the electronic balance and its application to a thermal analyzer is explained in the following description of the preferred embodiments.

DETAILED DESCRIPTION OF PREFERRED EMBODIMENTS

Figure 1:
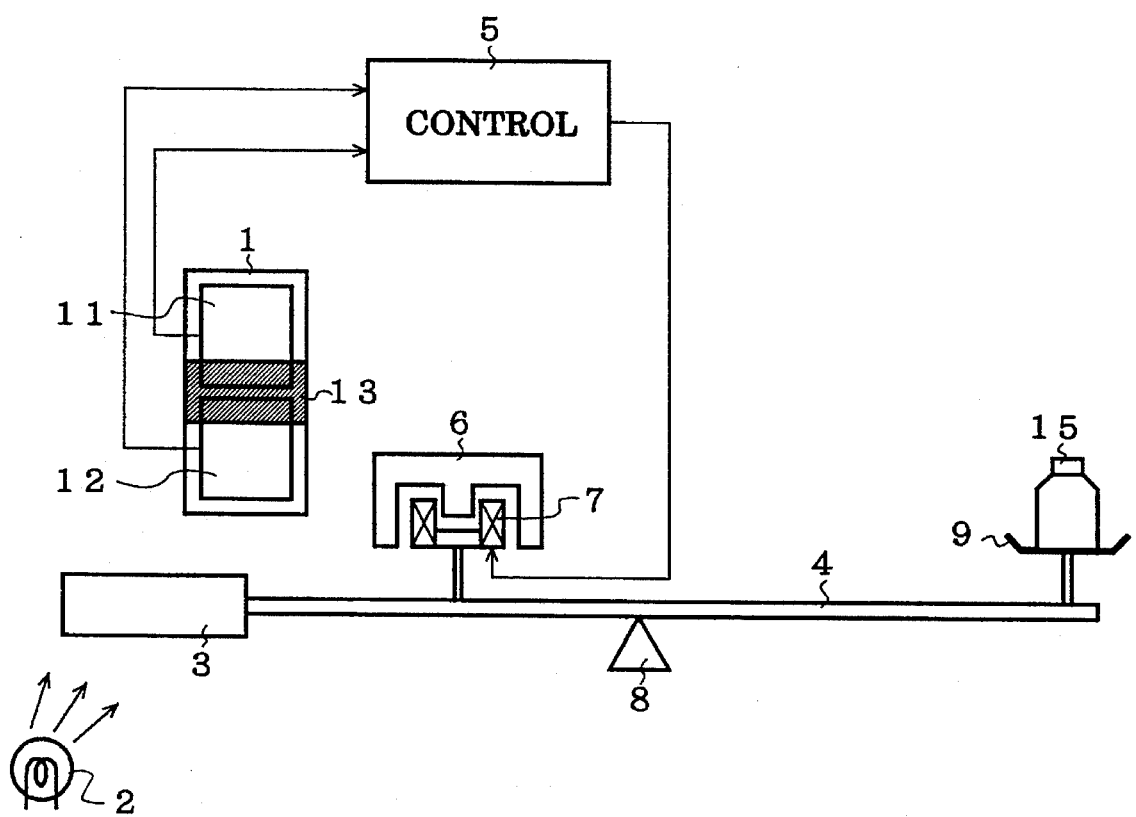
FIG. 1 is a diagram showing the structure of an electronic balance as the first embodiment of the present invention.
Figure 5:
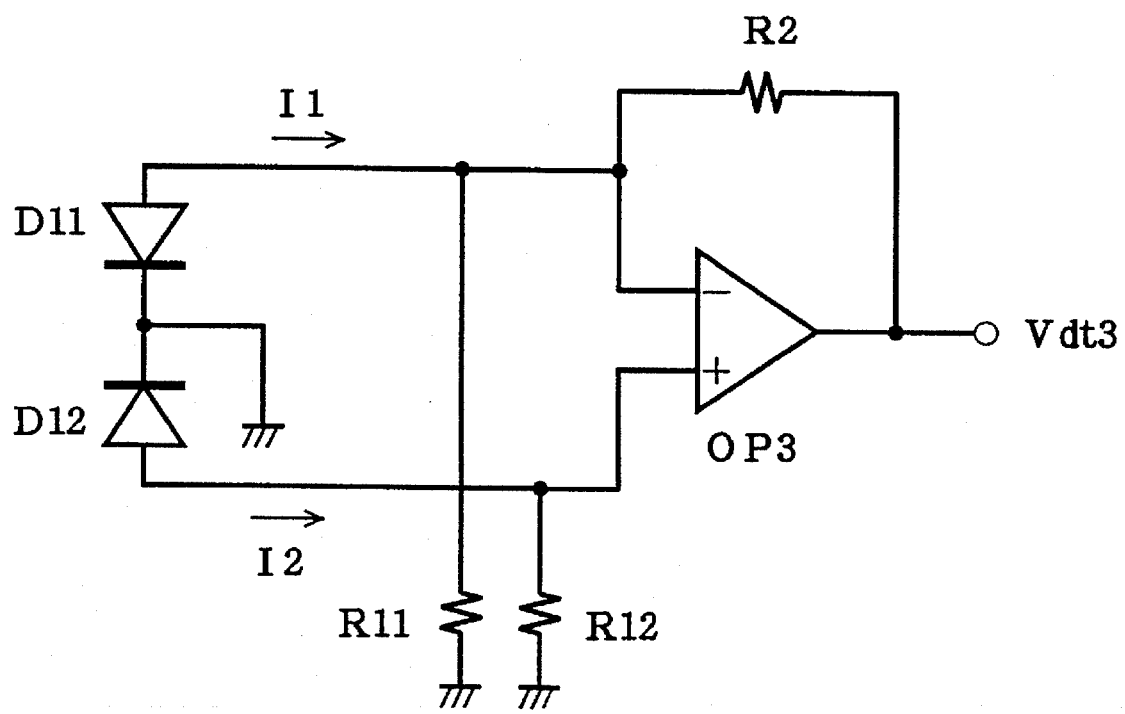
FIG. 5 is a circuit diagram of a prior art imbalance detecting circuit.

An electronic balance embodying the present invention is described. The basic structure of the electronic balance of the present embodiment shown in FIG. 1 is as already described in the explanation of the background. In this embodiment, as shown in FIG. 2, the imbalance detecting circuit of the controller 5 differs from that of the prior art (FIG. 5) in that it includes an adding circuit 20 and a second subtracting circuit 30 besides the subtracting circuit 10 used in the prior art controller.

Figure 2:
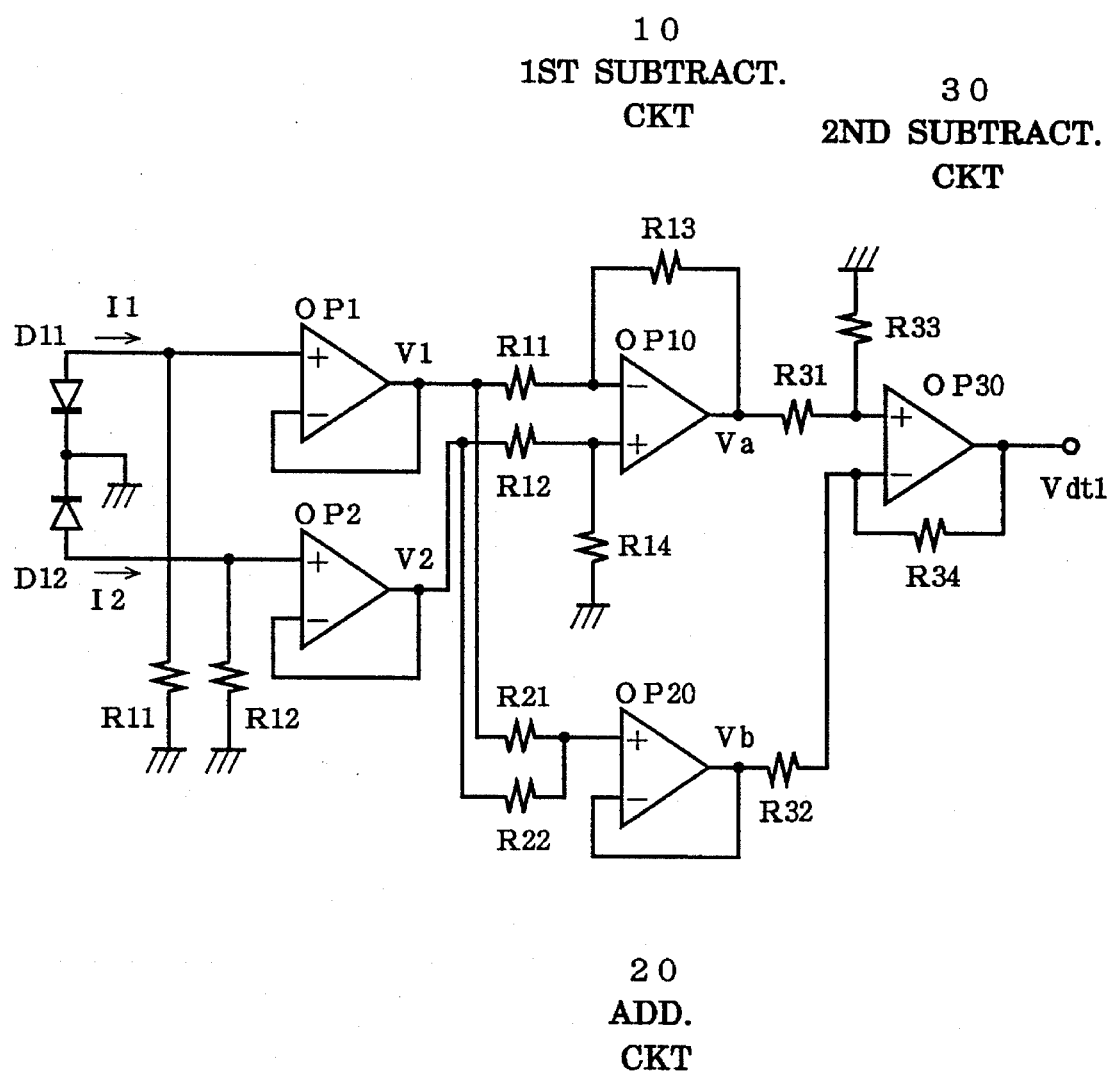
FIG. 2 is a circuit diagram of the imbalance detecting circuit of the first embodiment.

In the circuit diagram of FIG. 2, the two photodiodes D11 and D12 correspond to the two photosensitive areas 11 and 12 of the photoreceiver 1. As mentioned before, the current I1 flowing through the first photodiode D11 corresponds to the amount of light received by the first photosensitive area 11, and the current I2 flowing through the second photodiode D12 corresponds to the amount of light received by the second photosensitive area 12. The current I1 flows through a resistor R11 to the ground producing a voltage V1 proportional to the amount of the current I1, which is given, via a voltage follower using an operational amplifier OP1, to the subtracting circuit (first subtracting circuit) 10 and the adding circuit 20. Similarly, a voltage V2 proportional to the current I2 is produced by a resistor R12 and an operational amplifier OP2, and given to the first subtracting circuit 10 and the adding circuit 20.

The first subtracting circuit 10 of the present embodiment uses an operational amplifier OP10 and four resistors R11, R12, R13 and R14, and produces a voltage Va corresponding to the difference of the two inputs V1 and V2. The adding circuit 20 uses an operational amplifier OP20 and two resistors R21 and R22, and produces a voltage Vb corresponding to the sum of the two inputs V1 and V2. The two voltages Va and Vb are given to another subtracting circuit (second subtracting circuit) 30 including an operational amplifier OP30 and four resistors R31, R32, R33 and R34. The second subtracting circuit 30 produces a voltage Vdt1 corresponding to a linear polynomial of the two inputs Va and Vb (concretely, the difference of the input Va multiplied by a certain constant and the other input Vb). The output Vdt1 of the second subtracting circuit 30 in this embodiment represents the true movement of the beam 4 of the electronic balance, canceling the influence of the drift in the output of the photoreceiver 1, and is used to control the feedback coil 7.

Suppose here that the voltages V1 and V2 corresponding to the two photosensitive areas 11 and 12 have a thermal drift as $$V1 = Vo1 + c1 \cdot \Delta T$$

$$V2 = Vo2 + c2 \cdot \Delta T$$

where
- Vo1: voltage V1 at a reference temperature,
- Vo2: voltage V2 at the reference temperature,
- c1: thermal coefficient of the voltage V1 (the amount of change in V1 due to the unit change in the temperature),
- c2: thermal coefficient of the voltage V2 (the amount of change in V2 due to the unit change in the temperature), and
- ΔT: difference between the ambient temperature and the reference temperature.

As shown in FIG. 1, the amount of light received by the first photosensitive area 11 and that by the second photosensitive area 12 are complementary, i.e., $$Vo1 = Vc1 + a \cdot L$$

$$Vo2 = Vc2 + a \cdot L,$$

where
- Vc1: voltage V1 at the reference temperature when the beam 4 of the balance is in a predetermined (equilibrium) position,
- Vc2: voltage V2 at the reference temperature when the beam 4 is in the predetermined (equilibrium) position,
- a: change in the voltage V1 or V2 when the beam 4 moves the unit length, and
- L: displacement of the shadow 13 of the shutter 3 from the predetermined (equilibrium) position.

If the four resistors R11, R12, R13 and R14 of the first subtracting circuit 10 are set as $$R11 = R12 = R13 = R14,$$

the output voltage Va is $$\begin{aligned} Va &= V2 - V1 \\ &= Vo2 - Vo1 + (c2 - c1) \cdot \Delta T \\ &= Vc2 - Vc1 - 2 \cdot a \cdot L + (c2 - c1) \cdot \Delta T. \end{aligned} \quad (1)$$

If the two resistors R21 and R22 of the adding circuit 20 are set as $$R21 = R22,$$

the output voltage Vb is $$\begin{aligned} Vb &= (V1 + V2)/2 \\ &= (Vo1 + Vo2)/2 + (c1 + c2) \cdot \Delta T/2 \\ &= (Vc1 + Vc2)/2 + (c1 + c2) \cdot \Delta T/2. \end{aligned} \quad (2)$$

The equation (2) shows that the output Vb of the adding circuit 20 is independent of the position of the shadow 13 (i.e., independent of any turn of the beam 4), and depends only on the temperature.

If the two resistors R32 and R34 of the second subtracting circuit 30 are set as $$R32 = R34,$$

the output voltage Vdt1 is $$Vdt1 = \{2 \cdot R33/(R31 + R33)\} \cdot Va - Vb.$$

Introducing k as $$k = 2 \cdot R33/(R31 + R33), \ldots \quad (3)$$

the voltage Vdt1 is $$\begin{aligned} Vdt1 &= k \cdot Va - Vb \\ &= (k - 1/2) \cdot Vc2 - (k + 1/2) \cdot Vc1 - 2 \cdot k \cdot \\ &\quad a \cdot L + \{(k - 1/2) \cdot c2 - (k + 1/2) \cdot c1\} \cdot \Delta T \end{aligned} \quad (4)$$

By setting the values of the resistors R31 and R33 of the second subtracting circuit 30 so that $$(k - ½) \cdot c2 - (k + ½) \cdot c1 = 0$$

or $$k = (½) \cdot (c1 + c2)/(c2 - c1), \ldots \quad (5)$$

the equation (4) becomes $$Vdt1=(k-\frac{1}{2}).Vc2-(k+\frac{1}{2}).Vc1-2.k.a.L$$

which shows that the voltage Vdt1 (which is the output of the imbalance detecting circuit of the present embodiment) does not change even if the ambient temperature changes and it corresponds only to the position of the shadow 13 (i.e., to the turn of the beam 4).

In determining the values of the resistors R31 and R33, the value of (c1+c2)/(c2−c1) in equation (5) can be obtained by the following steps. First, stabilizing the beam 4 and changing the ambient temperature, the voltages Va and Vb of the subtracting circuit 10 and the adding circuit 20 are measured. Then the values of (c2−c1) and (c1+c2) are calculated by putting the values of Va and Vb in the equations (1) and (2). The values of the resistors R31 and R33 are determined using the equations (5) and (3).

Figure 3:
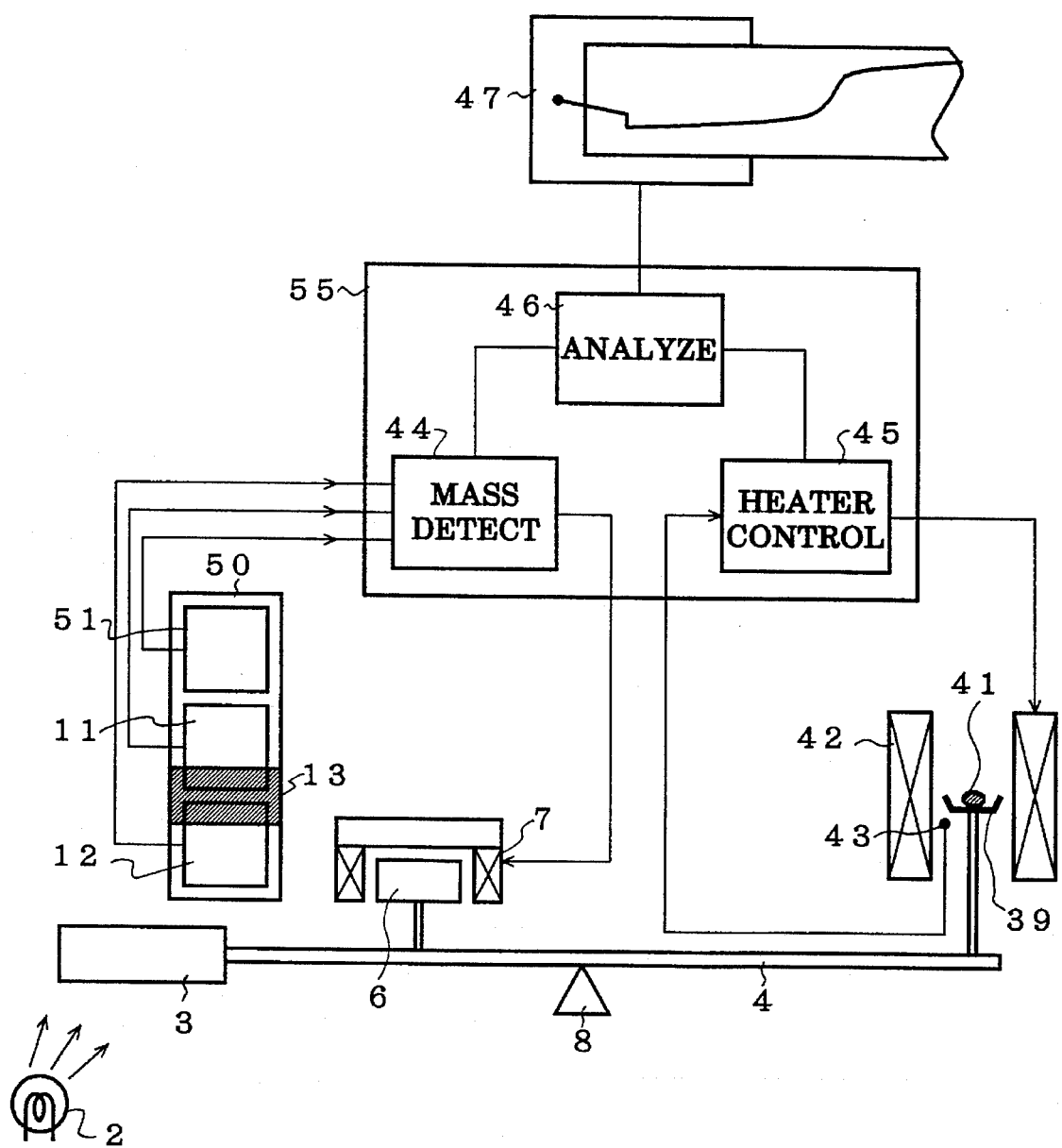
FIG. 3 is a diagram showing the structure of a thermal analyzer as the second embodiment of the present invention.

A thermal analyzer using an electronic balance according to the present invention is then described as the second embodiment. In the thermal analyzer of the present embodiment, as shown in FIG. 3, a sample 41 to be analyzed is put on the sample tray 39 and a heater 42 is provided around the sample 41. A thermal sensor 43 (e.g., a thermocouple) is placed near the sample 41 and the signal from the thermal sensor 43 is given to a heater control circuit 45 provided in the controller 55.

The controller 55 includes, besides the heater control circuit 45, a mass detecting circuit 44 and an analyzing circuit 46, and a recorder 47 is connected to the analyzing circuit 46. The analyzing circuit 46 conducts a thermal analysis of the sample 41 by giving a preset heating program to the heater controller 45 and receiving a signal representing the mass of the sample 41 from the mass detecting circuit 44, and sends a signal to the recorder 47 on which a thermal analysis curve is drawn.

Figure 4:
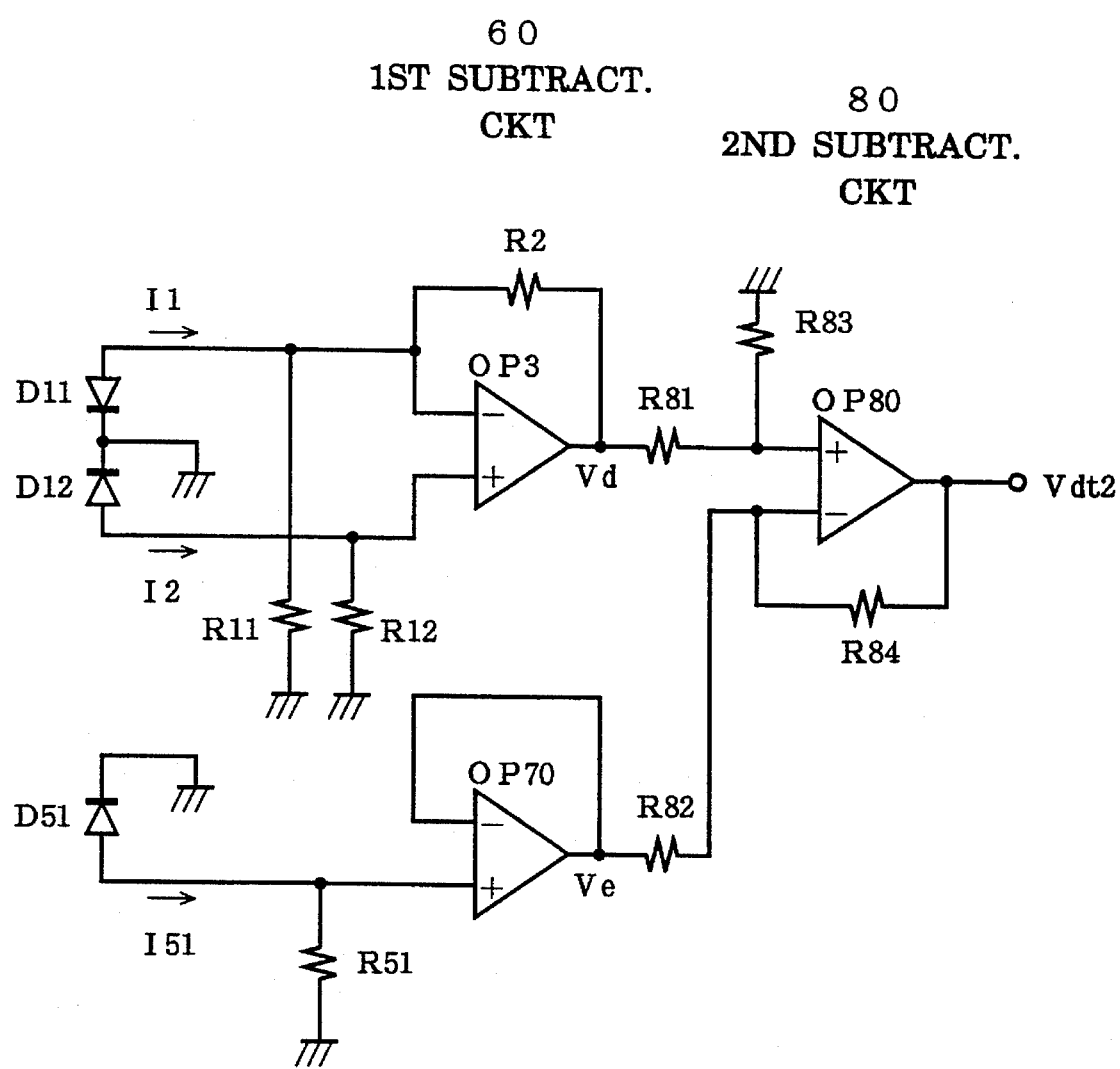
FIG. 4 is a circuit diagram of the imbalance detecting circuit of the second embodiment.

In the electronic balance of the present embodiment, the photoreceiver 50 has the third photosensitive area 51 besides the two photosensitive areas 11 and 12, and the imbalance detecting circuit as shown in FIG. 4 is included in the mass detecting circuit 44. The photoreceiver 50 is placed at the position where the shadow 13 of the shutter 3 does not intrude the third photosensitive area 51 within the range of normal turn of the beam 4.

In the circuit diagram of the imbalance detecting circuit in FIG. 4, the photodiodes D11 and D12 correspond to the two photosensitive areas 11 and 12, and the third photodiode D51 corresponds to the third photosensitive area 51. The currents I1 and I2 flowing through the photodiodes D11 and D12 are treated similarly to the previous embodiment by the first subtracting circuit 60 which produces a voltage Vd corresponding to the difference of the amounts of light received by the two photosensitive areas 11 and 12. The current I51 flowing through the third photodiode D51 is converted to a corresponding voltage Ve by a resistor R51 and an operational amplifier OP70 (a voltage follower). The voltage Vd and Ve are given to a second subtracting circuit 80. The second subtracting circuit 80 produces a voltage Vdt2 with a linear polynomial of the two input voltages Vd and Ve to cancel the influence of thermal drift in Vd.

Suppose in this case that the output voltage Ve of the third photosensitive area 51 has a thermal drift as $$Ve=Vc3+ c3.\Delta T \ldots \quad (6)$$

where

Vc3: voltage Ve at the reference temperature,
c3: thermal coefficient of the voltage Ve (the amount of change in Ve due to the unit change in the temperature), As described above, the third photosensitive area 51 is never covered by the shadow 13 of the shutter 3, and the output voltage Ve is subject only to the thermal drift, independent of any turn of the beam 4. By properly setting the values of the resistors R11, R12 and R2 of the first subtracting circuit 60, the output voltage Vd can be made, similar to the equation (1), as $$Vd=Vc22-Vc12-2.a2.L+(c22-c12).\Delta T \ldots \quad (7)$$

where

Vc12: voltage corresponding to the current I1 at the reference temperature when the beam 4 is in the predetermined (equilibrium) position, Vc22: voltage corresponding to the current I2 at the reference temperature when the beam 4 is in the predetermined (equilibrium) position, a2: change in the voltage corresponding to the change in the current I1 or I2 when the beam 4 moves the unit length, and The second subtracting circuit 80 of the present embodiment includes four resistances R81, R82, R83 and R84. By setting R82=R84, and introducing k2 as $$k2=2.R83/(R81+R83), \ldots \quad (8)$$

the output voltage Vdt2 of the second subtracting circuit 80 is $$\begin{aligned} Vdt2 &= k2 \cdot Vd - Ve \\ &= k2 \cdot (Vc22 - Vc12) - Vc3 - 2 \cdot k2 \cdot a2 \cdot \\ & \quad L + \{k2 \cdot (c22 - c12) - c3\} \cdot \Delta T. \end{aligned}$$

Thus, by setting the values of the resistors R81 and R83 so that $$k2.(c22-c12)-c3= 0$$

or $$k2=c3/(c22c12), \ldots \quad (9)$$

the output voltage Vdt2 becomes as $$Vdt2 =k2.(Vc22-Vc12)-Vc3-2.k2.a2.L,$$

which shows that Vdt2 is not influenced by the change in the ambient temperature and it corresponds only to the position of the shadow 13 (i.e., to the turn of the beam 4). In determining the values of the resistors R81 and R83, the value of c3/(c22−c12) in equation (9) can be obtained similarly to the previous embodiment. That is, first, the output voltages Vd and Ve of the first subtracting circuit 60 and of the operational amplifier OP70 are measured stabilizing the beam 4 and changing the ambient temperature. Then the values of c3 and (c2−c1) are calculated by putting the values of Vd and Ve in the equations (9) and (8).

In the above thermal analyzer of the second embodiment, the heater 42 can be replaced by a cooler for detecting low temperature characteristics of the sample.

What is claimed is:

1. An electronic balance comprising:

a beam sustained by a fulcrum and supporting a sample at a first arm of the beam;

an electromagnetic device for electromagnetically exerting a force on the beam;

a shutter fixed to the beam;

a photoemitter;

a photoreceiver placed opposing the photoemitter and including a first photosensitive area and a second photosensitive area aligned along a movement direction of the shutter so that a shadow of the shutter is cast on a portion of each of the first and second photosensitive areas;

a controller for receiving a first output and a second output from the first and second photosensitive areas, respectively and for sending a control signal to the electromagnetic device so that a difference between the first and second outputs is constant at a temperature, the control signal representing a mass of the sample; and correcting means responsive to the first and second outputs of the first and second photosensitive areas for correcting variations in the difference between the first and second outputs based on a sum of the first and second outputs, the variations resulting from changes in the temperature.

2. The electronic balance according to claim 1, wherein the controller comprises:

a first subtracting circuit for producing an output signal corresponding to the difference between the first and second outputs of the first and second photosensitive areas and the correcting means comprises:

an adding circuit for producing an output signal corresponding to the sum of the first and second outputs of the first and second photosensitive areas; and a second subtracting circuit for producing an output signal corresponding to a linear polynomial of the output signal of the first subtracting circuit and the output signal of the adding circuit.

3. The electronic balance of claim 1, wherein the electromagnetic device includes a moving part supported by a second arm of the beam and a fixed part placed independent of the beam.

4. An electronic balance comprising:

a beam sustained by a fulcrum and supporting a sample at a first arm of the beam;

an electromagnetic device for electromagnetically exerting a force on the beam;

a shutter fixed to the beam;

a photoemitter;

a photoreceiver placed opposing the photoemitter and including a first photosensitive area, a second photosensitive area, and a third photosensitive area in which the first and second photosensitive areas are aligned along a movement direction of the shutter so that a shadow of the shutter is cast on a portion of each of the first and second photosensitive areas and the third photosensitive area is placed out of the shadow;

a controller for receiving a first output and a second output from the first and second photosensitive areas, respectively and for sending a control signal to the electromagnetic device so that a difference between the first and second outputs is constant at a temperature, the control signal representing a mass of the sample; and correcting means responsive to an output of the third photosensitive area for correcting the control signal to compensate for variations in the difference between the first and second outputs resulting from changes in the temperature, based on the output of the third photosensitive area.

5. The electronic balance according to claim 4, wherein:

the controller comprises a first subtracting circuit for producing an output signal corresponding to the difference between the first and second outputs of the first and second photosensitive areas and the correcting means comprises a second subtracting circuit for producing an output signal corresponding to a linear polynomial of the output signal of the first subtracting circuit and the output of the third photosensitive area.

6. The electronic balance of claim 4, wherein the electromagnetic device includes a moving part supported by a second arm of the beam and a fixed part placed independent of the beam.

7. A thermal analyzer comprising:

a beam sustained by a fulcrum and supporting a sample at a first arm of the beam;

at least one of a heater and a cooler placed around the sample;

an electromagnetic device for electromagnetically exerting a force on the beam;

a shutter fixed to the beam;

a photoemitter;

a photoreceiver placed opposing the photoemitter and including a first photosensitive area and a second photosensitive area aligned along a movement of the shutter so that a shadow of the shutter is cast on a portion of each of the first and second photosensitive areas;

a controller for controlling the at least one of a heater and a cooler, for receiving a first output and a second output from the first and second photosensitive areas, respectively and for sending a control signal to the electromagnetic device so that a difference between the first and second outputs is constant at a temperature, the control signal representing a mass of the sample; and correcting means responsive to the first and second outputs of the first and second photosensitive areas for correcting the control signal to compensate for variations in the difference between the first and second outputs resulting from changes in the temperature, based on a sum of the first and second outputs.

8. The thermal analyzer according to claim 7, wherein the controller comprises:

a first subtracting circuit for producing an output signal corresponding to the difference between the first and second outputs of the first and second photosensitive areas and the correcting means comprises:

an adding circuit for producing an output signal corresponding to the sum of the first and second outputs of the first and second photosensitive areas; and a second subtracting circuit for producing an output signal corresponding to a linear polynomial of the output signal of the first subtracting circuit and the output signal of the adding circuit.

9. The electronic balance of claim 7, wherein the electromagnetic device includes a moving part supported by a second arm of the beam and a fixed part placed independent of the beam.

10. A thermal analyzer comprising:

a beam sustained by a fulcrum and supporting a sample at a first arm of the beam;

at least one of a heater and a cooler placed around the sample;

an electromagnetic device for electromagnetically exerting a force on the beam;

a shutter fixed to the beam;

a photoemitter;

a photoreceiver placed opposing the photoemitter and including a first photosensitive area, a second photosensitive area, and a third photosensitive area in which the first and second photosensitive areas are aligned along a movement direction of the shutter so that a shadow of the shutter is cast on a portion of each of the first and second photosensitive areas and the third photosensitive area is placed out of the shadow;

a controller for controlling the at least one of a heater and a cooler, for receiving a first output and a second output from the first and second photosensitive areas, respectively and for sending a control signal to the electromagnetic device so that a difference between the first and second outputs is constant at a temperature, the control signal representing a mass of the sample; and correcting means responsive to an output of the third photosensitive area for correcting the control signal to compensate for variations in the difference between the first and second outputs resulting from changes in the temperature, based on the output of the third photosensitive area.

11. The thermal analyzer according to claim 10, wherein:

the controller comprises a first subtracting circuit for producing an output signal corresponding to the difference between the first and second outputs of the first and second photosensitive areas and the correcting means comprises a second subtracting circuit for producing an output signal corresponding to a linear polynomial of the output signal of the first subtracting circuit and the output of the third photosensitive area.

12. The electronic balance of claim 10, wherein the electromagnetic device includes a moving part supported by a second arm of the beam and a fixed part placed independent of the beam.

\* \* \* \* \*